(12) United States Patent
Oh

(10) Patent No.: US 8,412,199 B2
(45) Date of Patent: Apr. 2, 2013

(54) METHOD AND APPARATUS DECREASING HANDOVER LATENCY IN HETEROGENEOUS NETWORKS

(75) Inventor: Se-Jong Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 11/651,293

(22) Filed: Jan. 9, 2007

(65) Prior Publication Data

US 2008/0064402 A1 Mar. 13, 2008

(30) Foreign Application Priority Data

Sep. 12, 2006 (KR) .......................... 10-2006-0088015

(51) Int. Cl.
*H04W 36/00* (2009.01)
(52) U.S. Cl. ..... 455/436; 370/331; 455/434; 455/435.1; 455/442
(58) Field of Classification Search ............... 455/432.1, 455/433, 436, 435.1–435.3, 438, 442
See application file for complete search history.

(56) References Cited

U.S. PATENT DOCUMENTS

| | | | |
|---|---|---|---|
| 6,950,655 B2 | 9/2005 | Hunkeler | |
| 2003/0092444 A1* | 5/2003 | Sengodan et al. | 455/436 |
| 2004/0053632 A1* | 3/2004 | Nikkelen et al. | 455/522 |
| 2004/0090937 A1* | 5/2004 | Chaskar et al. | 370/331 |
| 2004/0166859 A1* | 8/2004 | Hayashi et al. | 455/436 |
| 2005/0083887 A1* | 4/2005 | Lee et al. | 370/331 |
| 2006/0084439 A1* | 4/2006 | Joshi et al. | 455/436 |
| 2006/0099948 A1* | 5/2006 | Hoghooghi et al. | 455/436 |
| 2006/0183479 A1* | 8/2006 | Liu et al. | 455/436 |
| 2007/0026866 A1* | 2/2007 | Krishnamurthi et al. | 455/440 |
| 2007/0047491 A1* | 3/2007 | Dutta et al. | 370/331 |
| 2007/0160049 A1* | 7/2007 | Xie et al. | 370/390 |

FOREIGN PATENT DOCUMENTS

| | | |
|---|---|---|
| JP | 2004-260234 | 9/2004 |
| JP | 2005-159929 | 6/2005 |
| KR | 10-20050069398 | 7/2005 |
| KR | 10-2005-0120426 | 12/2005 |
| KR | 10-2005-0121118 | 12/2005 |
| KR | 10-2005-0121119 | 12/2005 |
| KR | 10-20060032544 | 4/2006 |

* cited by examiner

*Primary Examiner* — Wesley Kim
*Assistant Examiner* — Dinh P Nguyen
(74) *Attorney, Agent, or Firm* — NSIP Law

(57) ABSTRACT

Provided is a method and apparatus for decreasing a handover latency time using a context exchange between a mobile terminal (MT) and a Media Independent Handover Server (MIHS). The method used by the MT for decreasing handover latency between a first network and a second network includes when a handover is performed from the first network to the second network, transmitting to the MIHS information required for first network communication as context; and when a handover is performed from the second network to the first network, receiving from the MIHS first network access information comprising the context through the currently used second network. Accordingly, the MT can reduce a Vertical Handover (VHO) latency time and simultaneously consume almost the same power as a single mode terminal.

24 Claims, 6 Drawing Sheets

METHOD AND APPARATUS DECREASING HANDOVER LATENCY IN HETEROGENEOUS NETWORKS

PRIORITY

This application claims priority under 35 U.S.C. §119 to an application entitled "Method and Apparatus for Decreasing Handover Latency in Heterogeneous Networks" filed in the Korean Intellectual Property Office on Sep. 12, 2006 and assigned Serial No. 2006-88015, the contents of which are incorporated herein by reference.

BACKGROUND OF THE INVENTION

1. Field of the Invention

The present invention relates generally to a method and apparatus for decreasing handover latency in heterogeneous networks, and in particular, to a method and apparatus for decreasing a handover latency time using a context exchange between a mobile terminal and a Media Independent Handover Server (MIHS).

2. Description of the Related Art

Handovers are largely classified into a hard handover, a soft handover, and a seamless handover. In particular, a handover between heterogeneous networks (a vertical handover (VHO)) requires a continuous service through the seamless handover and power saving of a mobile terminal.

However, in a conventional VHO method, the execution latency of a VHO is long. Since discontinuity in packet transfer occurs if the VHO execution latency time is long, continuous communications cannot be smoothly accomplished. In addition, according to the conventional VHO method, two modes must be simultaneously monitored. That is, a mobile terminal must periodically wake up in order to receive information regarding a currently unused mode through a downlink. Thus, a dual mode terminal consumes more power than a single mode terminal.

In order to describe the VHO execution latency time, it is assumed that a mobile terminal (MT) has a dual mode of Wireless Local Area Network (WLAN) and Worldwide Interoperability for Microwave Access (WiMAX). In addition, it is assumed that a mobile terminal (MT) is located in an area where the two modes coexist and is currently communicating through WLAN.

If the MT desires to handover to a WiMAX Access Network (AN), the MT pre-sets a WiMAX wireless channel and performs a handover process through the pre-set WiMAX wireless channel. In this case, the MT performs the handover process by securing the WiMAX wireless channel in an early stage. Thus, handover latency is relatively short. However, a time period in which WLAN and WiMAX must operate at the same time is long. That is, since the MT must communicate through WLAN even while performing the handover process to WiMAX, power consumption of the MT is maximized.

According to the prior art, before setting the WiMAX wireless channel, the MT can perform the handover process to WiMAX through a currently used WLAN channel. In this case, the MT pre-performs a portion related to the handover process to WiMAX through the currently activated WLAN channel instead of securing the WiMAX wireless channel in an early stage. That is, the MT uses only one mode during the VHO by performing resource allocation signaling for requesting for resources to be used in a WiMAX area through the WLAN channel. Thus, power consumption is reduced.

However, since the MT must perform VHO-related signaling to the WiMAX area, the time required for the VHO is greatly increased.

Thus, a handover latency decreasing method is required, whereby an MT can reduce a VHO execution latency time and consume almost the same power as a single mode terminal.

SUMMARY OF THE INVENTION

An object of the present invention is to substantially solve at least the above problems and/or disadvantages and to provide at least the advantages below. Accordingly, an object of the present invention is to provide a method and apparatus for decreasing handover latency when a handover to a heterogeneous network is performed.

Another object of the present invention is to provide a handover method and apparatus, whereby a dual mode terminal can consume almost the same power as a single mode terminal when a handover to a heterogeneous network is performed.

A further object of the present invention is to provide a method and apparatus for decreasing handover latency in heterogeneous networks, whereby a seamless and power saving handover is performed using a context exchange between a mobile terminal (MT) and a Media Independent Handover Server (MIHS).

According to one aspect of the present invention, there is provided a method used by an MT for decreasing handover latency between a first network and a second network, the method includes when a handover is performed from the first network to the second network, transmitting to an MIHS information required for first network communication as context; and when a handover is performed from the second network to the first network, receiving from the MIHS first network access information including the context through the currently used second network.

According to another aspect of the present invention, there is provided a method used by an MIHS for decreasing handover latency between a first network and a second network, the method includes receiving from an MT information required for first network communication as context; receiving from the MT a request of first network access information comprising the context; and transmitting to the MT the first network access information.

According to another aspect of the present invention, there is provided a system for decreasing handover latency from a first network to a second network, the system includes an MT for transmitting to an MIHS information required for first network communication as context when a handover is performed from the first network to the second network, and receiving from the MIHS first network access information comprising the context through the currently used second network when a handover is performed from the second network to the first network; and the MIHS for receiving from the MT the context, receiving from the MT a request of the first network access information, and transmitting to the MT the first network access information comprising the context.

According to another aspect of the present invention, there is provided an MT apparatus for decreasing handover latency from a first network to a second network, the apparatus includes a memory for storing information required for first network communication as context and a controller for controlling the handover latency by controlling the memory, wherein when a handover is performed from the first network to the second network, transmitting to an MIHS the information required for first network communication as the context; and when a handover is performed from the second network to the first network, receiving from the MIHS first network access information comprising the context.

According to another aspect of the present invention, there is provided an MIHS apparatus for decreasing handover latency from a first network to a second network, the apparatus includes a memory for storing network access information and context and a controller for controlling the handover latency by controlling the memory, wherein information required for first network communication as the context is received from an MT, a request of first network access information comprising the context is received from the MT, and the first network access information is transmitted to the MT.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

1. A Method used by a Mobile Terminal (MT) for Decreasing Vertical Handover (VHO) Latency A method of used by an MT for decreasing handover latency in heterogeneous networks will now be described with reference to FIGS. 1 and 2.

The heterogeneous networks to be used in the present invention will be described. It is assumed that the MT can perform communication by accessing an Institute of Electrical and Electronics Engineers (IEEE) 802.11 Access Network (AN) such as Wireless Local Area Network (WLAN), a Worldwide Interoperability for Microwave Access (WiMAX) AN or an IEEE 802.16 AN similar to the WiMAX AN, a 3$^{rd}$ Generation Partnership Project (3GPP) network, or a 3GPP2 network. Among these networks. A case where a first network is represented by the WiMAX AN and a second network is represented by the WLAN AN will be described with reference to FIG. 1. The WiMAX AN and the WLAN AN are based on IEEE 802.16, and it may be assumed that the first network indicates a Wireless Broadband Access (Wibro) AN.

Figure 1:
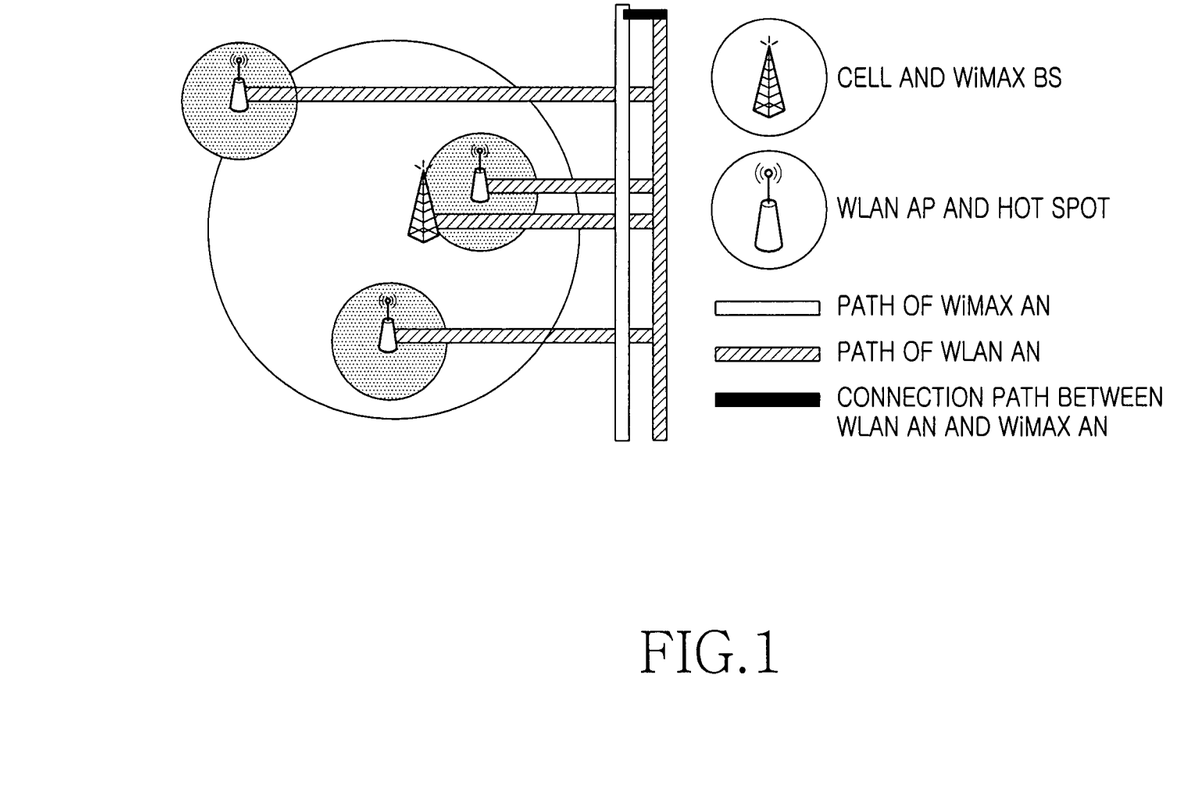
FIG. 1 is a conceptual diagram of a Worldwide Interoperability for Microwave Access (WiMAX) Access Network (AN) and a Wireless Local Area Network (WLAN) AN overlapping each other according to the present invention.

FIG. 1 is a conceptual diagram of a WiMAX AN and a WLAN AN overlapping each other according to the present invention.

Referring to FIG. 1, the WiMAX AN and the WLAN AN overlap each other, and the WiMAX AN includes the WLAN AN therein. It is assumed that an MT is located at an area where the two modes coexist and the MT is currently communicating with the WLAN AN.

In FIG. 1, the MT, i.e., a dual mode terminal, begins first a service with the WiMAX AN having a super-set concept and then searches for the WLAN AN, and when a service with the WLAN AN can be performed, the MT performs a handover process to the WLAN AN.

According to the present invention, the MT first performs with the WiMAX AN and then transmits to a Media Independent Handover Server (MIHS) information required to access the WiMAX AN as context. That is, the MT previously transmits information regarding the WiMAX AN as context to the MIHS for preparing when the MT performs a handover from the WLAN AN to the WiMAX AN in the future.

When a handover is performed from the WLAN AN to the WiMAX AN, the MS can use a context transfer protocol through a currently activated WLAN channel. The MT receives its context information related to the WiMAX AN, which is stored in the MIHS. In this case, the MIHS determines if the context of the MT is currently available resources, and if available resources are changed, the MIHS updates the context and transmits the updated context to the MT. The context information allows the MT to omit a network scanning and quick ranging procedure (a physical procedure, requiring about 10 msec), a security authentication and mobile Internet Protocol (IP) procedure (requiring about 1.5~2 sec), and a service registration procedure (requiring less than 1 sec), which must be performed when the MT performs a handover to the WiMAX AN. The MT can directly receive a service using the context information received from the MIHS.

According to the present invention, since the MT can use only one mode when a handover between heterogeneous networks, i.e., a VHO, is performed, power consumption can be reduced. In addition, since various signaling procedures for the VHO can be omitted, VHO latency can be reduced.

Figure 2:
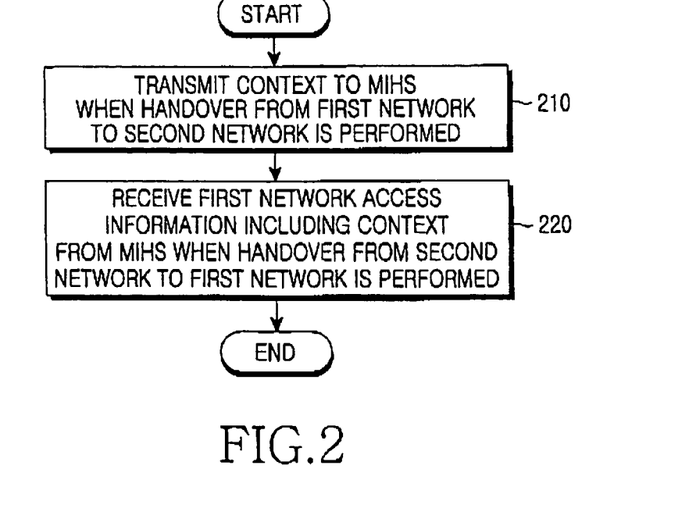
FIG. 2 is a flowchart illustrating a method of decreasing handover latency in a mobile terminal (MT) according to the present invention.

FIG. 2 is a flowchart illustrating a method of decreasing VHO latency in an MT according to the present invention.

Referring to FIG. 2, in step 210, the MT transmits context to an MIHS when the MT performs a handover from a first network to a second network. Step 210 will be described in detail with reference to FIG. 3. In step 220, the MT receives first network access information including the context from the MIHS when the MT performs a handover from the second network to the first network. Step 220 will be described in detail with reference to FIG. 4.

The first network may represent a WiMAX network, and the second network may represent a WLAN network. That is, in a network configuration in which a first AN includes a second AN therein, a method used by the MT for decreasing handover latency using a context exchange can be used. Alternatively, each of the first and second networks may be an IEEE 802.11, IEEE 802.16, Code Division Multiple Access (CDMA), or Wideband CDMA (WCDMA) network, which is available in the MT.

The context can be exchanged between the MT and the MIHS using the context transfer protocol. The context can include channel Identifications (IDs), ranging information, security information, a network address, and service relevant information as information required for a network access. The first network access information includes the context, and the MIHS determines if the context can be used for an access to the first network. The MIHS may determine using network servers if the context can be used for an access to the first network.

1.1 A Process of Transmitting Context from the MT to the MIHS

A method of decreasing handover latency will be described with reference to FIG. 3.

Figure 3:
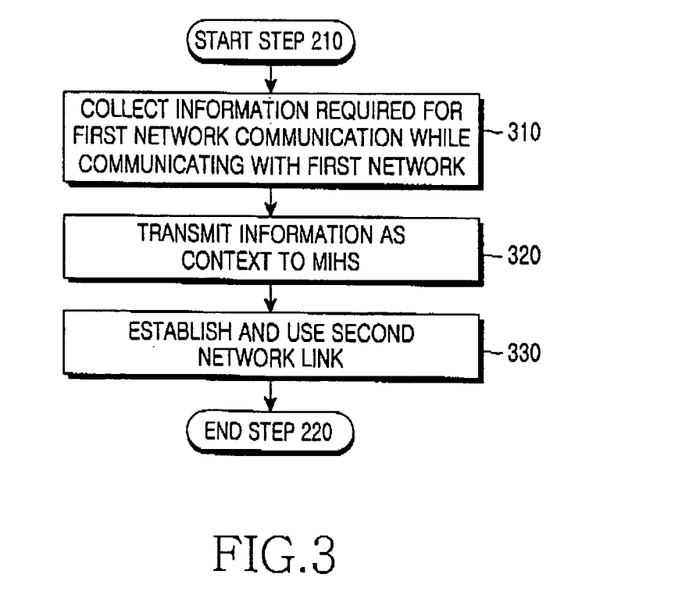
FIG. 3 is a flowchart illustrating a process of transmitting context from an MT to a Media Independent Handover Server (MIHS) according to the present invention.

FIG. 3 is a flowchart illustrating the process of transmitting context from the MT to the MIHS when a handover is performed from the first network to the second network according to the present invention.

Referring to FIG. 3, the MT collects information required for first network communication while communicating with the first network in step 310. The MT transmits the information as context to the MIHS in step 320. The MT activates a second network link by establishing the second network link in step 330.

In the context transmission process according to the present invention, the MT collects first network access information while communicating with the first network and transmits the first network access information as context to the MIHS. The context is previously transmitted in order for the MT to use when the MT performs a handover to the first network in the future. Thus, when the MT performs a handover to the first network in the future, the MT can perform a quick handover using the first network access information with using only one mode.

1.2 A Process of Transmitting Network Access Information from the MIHS to the MT A method of decreasing handover latency will be described with reference to FIG. 4.

Figure 4:
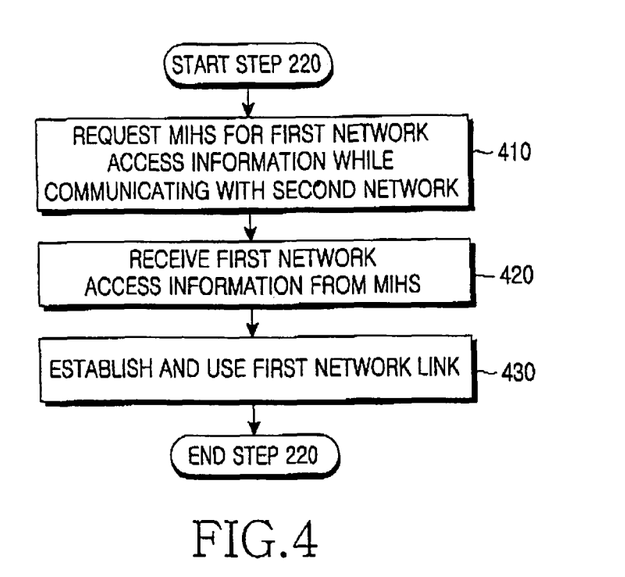
FIG. 4 is a flowchart illustrating a process used by an MT for receiving first network access information from an MIHS according to the present invention.

FIG. 4 is a flowchart illustrating a process used by the MT for receiving first network access information including context from the MIHS when a handover is performed from the second network to the first network according to the present invention.

Referring to FIG. 4, in step 410, the MT requests the MIHS for first network access information while communicating with the second network. The MT receives the first network access information from the MIHS in step 420. The first network access information is obtained by updating context in the MIHS in order to be used as the first network access information. The MT uses a first network link by establishing the first network link in step 430.

If the MT does not have the first network access information, the MT must perform network scanning, ranging, security authentication, and mobile IP binding update. In addition, since the MT must perform communication for both the first network and the second network even during a handover, power consumption is maximized.

According to the present invention, the MT uses the first network access information when the MT performs a handover from the second network to the first network. The first network access information is information required for first network communication, which is previously transmitted from the MT to the MIHS. If the MT does not have the first network access information, the MT must collect information required for a handover process again from the first network. However, a VHO latency time can be reduced by the MT receiving the first network access information from the MIHS, and power consumption can be reduced by the MT using only one mode.

2. A Method of Decreasing VHO Latency in an MIHS

Figure 5:
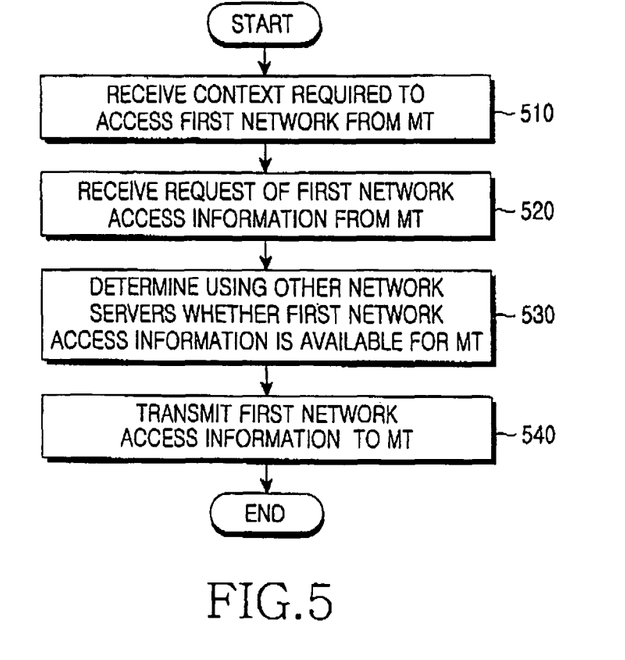
FIG. 5 is a flowchart illustrating a method of decreasing handover latency in an MIHS according to the present invention.

FIG. 5 is a flowchart illustrating a method of decreasing handover latency in an MIHS according to the present invention.

Referring to FIG. 5, the MIHS receives information required for first network communication as context from an MT in step 510. The MIHS receives a request of first network access information from the MT in step 520. In step 530, the MIHS determines, using other network servers, if the first network access information is available for the MT. The first network access information is obtained by updating the context so that the context can be used as the first network access information. The MIHS transmits the first network access information to the MT in step 540.

A conventional MIHS suggested in IEEE 802.21 performs the functions of transmitting information regarding a network to an MT and receiving an event occurring in the MT through the network. However, unlike the present invention, the conventional MIHS does not have functions of storing information required for a network access as context and transmitting and receiving the network access information. According to operations of the conventional MIHS suggested in IEEE 802.21, only a function of transmitting static network information (adjacent base station information, etc.) for the most part in an initial stage is defined. That is, a profile of information (an IP address of an MT, authentication information, a using service characteristic, etc.) varying in real-time according to the MT is not managed. According to the present invention, by strengthening the functions of the MIHS, the MIHS can collect real-time information regarding an operation of an MT and make a decision about the MT.

3. A System for Decreasing VHO Latency

A system for decreasing VHO latency will now be described with reference to FIGS. 6 to 8.

Figure 6:
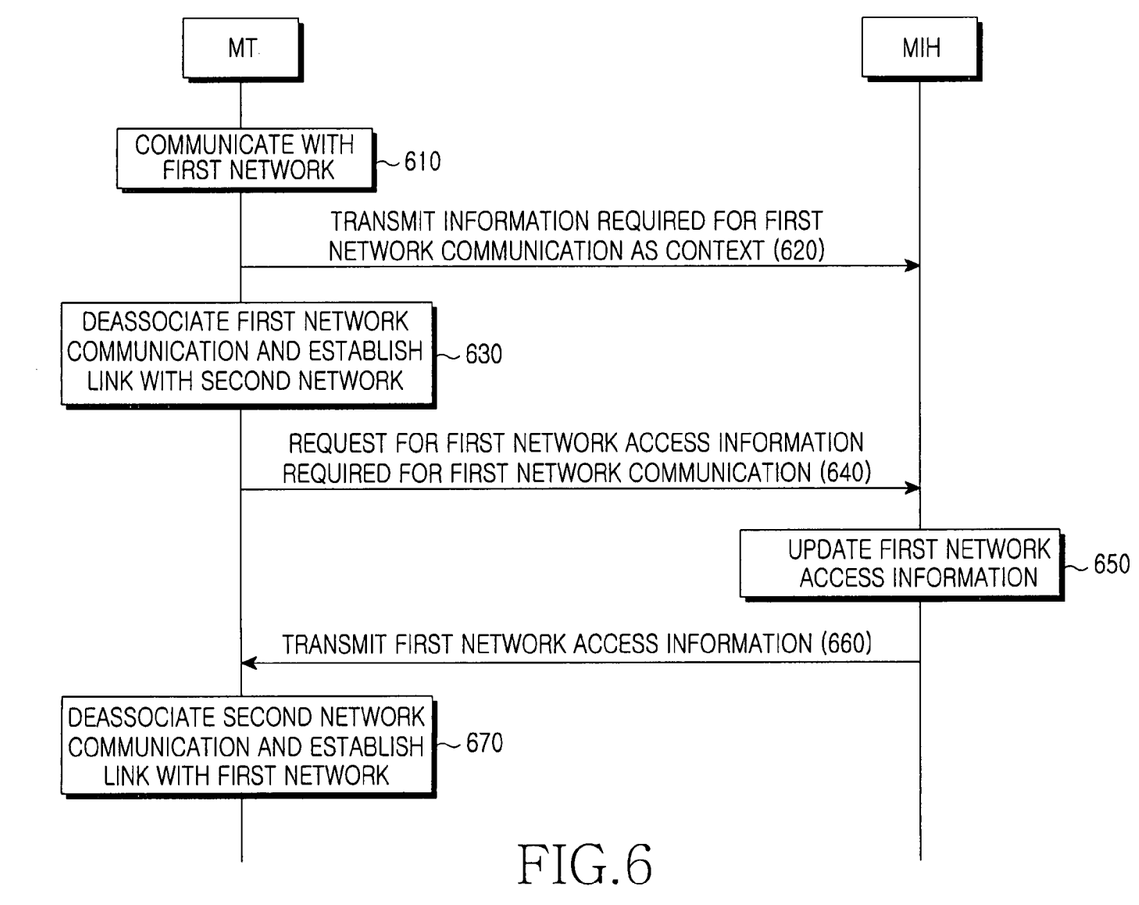
FIG. 6 is a signaling diagram illustrating a method of decreasing handover latency in a system according to the present invention.

FIG. 6 is a signaling diagram illustrating a method of decreasing handover latency between an MT and an MIHS in a system according to the present invention.

Referring to FIG. 6, the MT performs communication with a first network in step 610. The MT transmits information required for first network communication as context to the MIHS in step 620. The MT disassociates from the first network and establishes a link with a second network in step 630. The MT requests the MIHS for first network access information required for the first network communication in step 640. The MIHS updates the first network access information in step 650. The MIHS transmits the first network access information to the MT in step 660. The MT disassociates from the second network and establishes a link with the first network in step 670.

Figure 7:
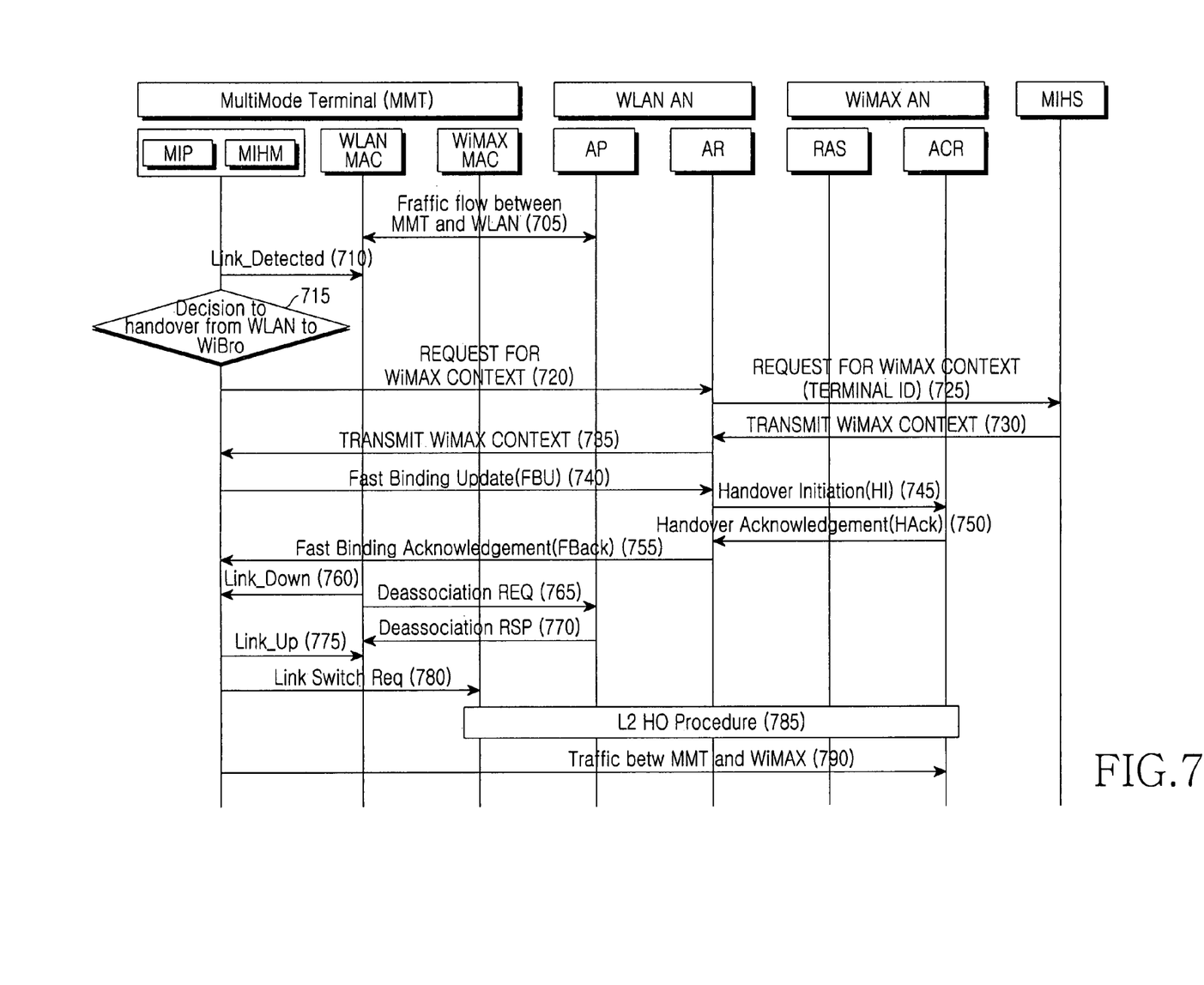
FIG. 7 is a detailed signaling diagram illustrating a method of decreasing handover latency in a system according to the present invention.

FIG. 7 is a detailed signaling diagram for describing a system for decreasing handover latency, which uses a WiMAX network and a WLAN network as heterogeneous networks, according to the present invention.

Abbreviations used in FIG. 7 are as follows. MAC stands for Media Access Control, AP stands for Access Point, and AR stands for Access Router. A Registration, Admission and Status (RAS) performs procedures such as registration, connection admission, status report, and disassociation. An Access Control Router (ACR) generally performs a role of a wired router in a wireless system and takes in charge of roaming while moving. The AR or ACR is an upper layer higher up than the MAC, and relays context between an MT and an MIHS using the context transfer protocol.

Referring to FIG. 7, an MT includes a multi-mode terminal (MMT). The MMT enables communication with a WLAN AN and a WiMAX AN. The MT further includes a Media Independent Handover Module (MIHM). The MIHM includes a memory for storing context required for network access information and a controller for controlling handover latency by controlling the memory.

A WLAN MAC of the MMT and an AP of the WLAN AN have a traffic flow in step 705. That is, in step 705, the MT and the WLAN AN performs communication with each other. The MIHM of the MT detects a link from a WiMAX MAC in step 710. The MIHM of the MT determines in step 715 whether a handover from WLAN to WiMAX is performed.

If it is determined in step 715 that the handover is performed, the MIHM of the MT requests an AR of the WLAN AN for WiMAX context in step 720. The AR of the WLAN AN transmits a WiMAX context request including a terminal ID to an MIHS in step 725. It is assumed that the MIHS updates the requested context so as to be available in the WiMAX AN.

The MIHS transmits the WiMAX context to the AR of the WLAN AN in step 730. The AR of the WLAN AN transmits the WiMAX context to the MIHM of the MT in step 735.

The MIHM of the MT transmits a Fast Binding Update (FBU) message to the AR of the WLAN AN in step 740. The AR of the WLAN AN transmits a Handover Initiation (HI) message to an ACR of the WiMAX AN in step 745. In response to the HI message, the ACR of the WiMAX AN transmits a Handover Acknowledgement (HAck) message to the AR of the WLAN AN in step 750. The AR of the WLAN AN transmits a Fast Binding Acknowledgement (FBAck) message to the MIHM of the MT in step 755.

The MIHM of the MT closes (Link_Down) a link of the WLAN MAC in step 760. The MIHM of the MT transmits a disassociation request message to the AP of the WLAN AN in step 765. The AP of the WLAN AN transmits a disassociation response message to the MIHM of the MT in step 770.

The WiMAX MAC of the MT transmits a link establishment (Link_Up) message to the MIHM in step 775. The MIHM of the MT transmits a link switch request message to the WiMAX MAC in step 780. A layer 2 handover procedure is performed in step 785, and the MMT and the WiMAX AN begin communication with each other in step 790.

4. Interfaces for Decreasing VHO Latency

Interfaces for decreasing VHO latency will now be described with reference to FIG. 8.

Figure 8:
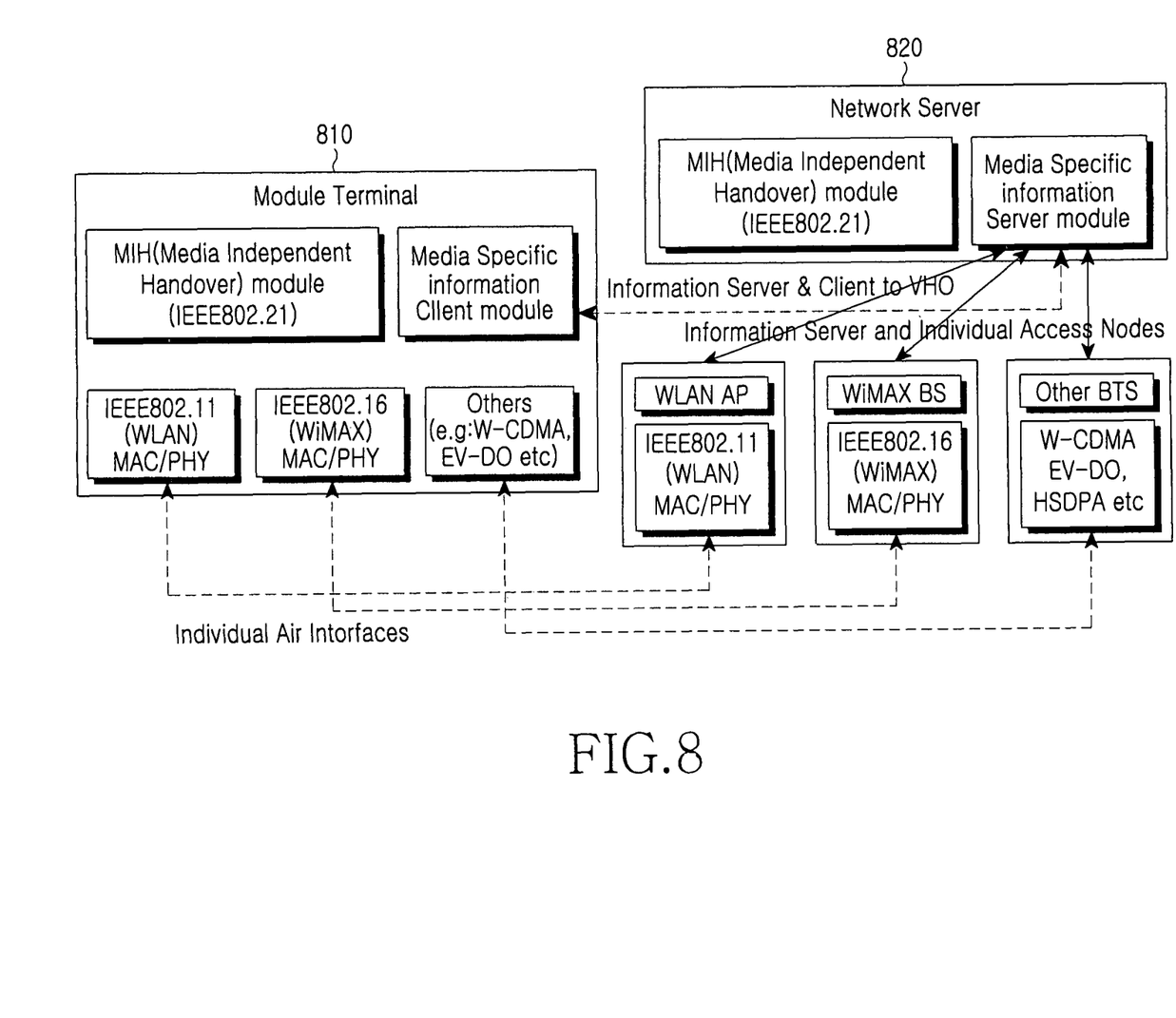
FIG. 8 is a block diagram of interfaces for decreasing handover latency according to the present invention.

FIG. 8 is a block diagram of interfaces of an MT 810 and a network server 820 according to the present invention.

Referring to FIG. 8, the MT 810 includes an MIHM defined in IEEE 802.21 and a media specific information client module suggested in the present invention. The media specific information client module may be included in the MIHM.

The network server 820 includes an MIHM and a media specific information client module suggested in the present invention. The media specific information client module may be included in the MIHM.

Each of the MIHM and the media specific information client module transmits and receives a VHO relevant information message by being connected to an IEEE 802.11 AN (a WLAN MAC layer/physical layer), an IEEE 802.16 AN (a WiMAX MAC layer/physical layer), or other one (e.g., WCDMA or Evolution Data Only (EV-DO)).

The media specific information client module transmits and receives a VHO relevant information message to and from a WLAN AP, a WiMAX Base Station (BS), or other Base Terminal Station (BTS).

A WLAN MAC layer/physical layer of the MT 810 transmits and receives a message to and from a MAC layer/physical layer of the WLAN AP. A WiMAX MAC layer/physical layer of the MT 810 transmits and receives a message to and from a MAC layer/physical layer of the WiMAX BS. Likewise, a MAC layer/physical layer of other mode of the MT 810 transmits and receives a message to and from a MAC layer/physical layer of a relevant BTS.

According to the present invention, an MT receives context related to wireless channel, network, and service information of a WiMAX network (first network) through a currently activated WLAN network (second network) and establishes settings. Thus, a time for simultaneously operating two modes is very short or does not exist. Accordingly, power consumption of the MT for a VHO can be significantly reduced.

A conventional VHO method uses a method of receiving network information and service relevant information of a WiMAX area through a WLAN network before a WiMAX wireless channel is set. Thus, according to the conventional VHO method, since a time for an MT to obtain network access information in a WLAN area through negotiation takes long, VHO latency increases.

According to the present invention, an MT transmits all information used in a WiMAX area to an MIHS before the MT performs a handover from WiMAX to WLAN so that the MIHS stores the information, and when the MT re-enters to the WiMAX area, the MT receives the information from the MIHS. Thus, a time for negotiation with a network is removed, VHO latency can be significantly reduced.

In addition, since a network determines (inside the network) whether resources in context stored in the MIHS are currently available and transmits the context after an update process is performed if necessary, a possibility of a VHO failure is reduced.

As described above, according to the present invention, when a handover between heterogeneous networks is performed, handover latency of an MT is reduced.

In addition, when a handover between heterogeneous networks is performed, since an MT having multiple modes can perform the handover using only one mode, power consumption of the MT can be reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of a mobile terminal (MT) for decreasing handover latency between a first network and a second network, the method comprising:

when a first handover is performed from the first network to the second network, transmitting, to a Media Independent Handover Server (MIHS), context including first network access information that the MT uses to access the first network;

when a second handover is performed from the second network to the first network, receiving, from the MIHS, through the currently used second network, the first network access information previously used to access the first network and which was previously transmitted from the MT to the MIHS; and performing the second handover from the second network back to the first network without a network scanning procedure, a ranging procedure, a security authentication procedure, a mobile Internet Protocol (IP) binding update procedure, and a service registration procedure, based on the first network access information received from the MIHS and which was previously transmitted from the MT to the MIHS, wherein the MIHS manages a profile of information varied in real-time, and the profile of information comprises at least one of Internet Protocol address of the MT, authentication information, and a using service characteristic.

2. The method of claim 1, wherein the first network access information comprises a channel identification (ID), ranging information, security information, and a network address.

3. The method of claim 1, wherein the first network access information includes updated context that is obtained by the MIHS.

4. The method of claim 1, wherein the first network access information is update information determined by the MIHS that the context is available as the first network access information.

5. The method of claim 1, wherein the first network access information is transmitted and received using a context transfer protocol.

6. The method of claim 1, wherein the transmitting to the MIHS comprises:
   collecting the first network access information used for first network communication by communicating with the first network;
   transmitting to the MIHS the context including the first network access information; and
   communicating with the second network by establishing a second network link.

7. The method of claim 1, wherein the receiving from the MIHS the first network access information comprises receiving the first network access information including network information and service relevant information of the first network before setting a second network wireless channel.

8. The method of claim 1, wherein the receiving from the MIHS the first network access information comprises:
   receiving from the MIHS the first network access information through the currently used second network; and
   disassociating the second network link and beginning communication with the first network using the received first network access information.

9. The method of claim 1, wherein a cell area of the first network includes a cell area of the second network.

10. The method of claim 1, wherein the first network is one of an Institute of Electrical and Electronic Engineers (IEEE) 802.11 network, an IEEE 802.16 network, a Third Generation Partnership Project (3GPP) network, or a 3GPP2 network, and the second network is one of an Institute of Electrical and Electronic Engineers (IEEE) 802.11 network, an IEEE 802.16 network, a Third Generation Partnership Project (3GPP) network, or a 3GPP2 network.

11. A method used by a Media Independent Handover Server (MIHS) for decreasing handover latency between a first network and a second network, the method comprising:
   receiving, from a mobile terminal (MT), when a first handover is performed, context including first network access information that is used by the MT to access the first network;
   receiving, from the MT, a request for information for the MT to use to perform a second handover comprising the first network access information that was previously used by the MT to access the first network access; and
   transmitting, to the MT, through the second network when a second handover is performed, information for the MT to use to perform the second handover from the second network back to the first network without a network scanning procedure, a ranging procedure, a security authentication procedure, a mobile Internet Protocol (IP) binding update procedure, and a service registration procedure, the information comprising the previously received first network access information,
   wherein the MIHS manages a profile of information varied in real-time, and the profile of information comprises at least one of Internet Protocol address of the MT, authentication information, and a using service characteristic.

12. The method of claim 11, further comprising determining using other network servers whether the first network access information is available resources information.

13. The method of claim 11, wherein the first network access information includes a channel identification (ID), ranging information, security information, and a network address.

14. The method of claim 11, wherein the first network access information is update information determined by the MIHS that the context is available as the first network access information.

15. The method of claim 11, wherein the first network access information is transmitted and received using a context transfer protocol.

16. The method of claim 11, wherein a cell area of the first network includes a cell area of the second network.

17. The method of claim 11, wherein the first network is one of an Institute of Electrical and Electronic Engineers (IEEE) 802.11 network, an IEEE 802.16 network, a Third Generation Partnership Project (3GPP) network, or a 3GPP2 network, and the second network is one of an Institute of Electrical and Electronic Engineers (IEEE) 802.11 network, an IEEE 802.16 network, a Third Generation Partnership Project (3GPP) network, or a 3GPP2 network.

18. A system for decreasing handover latency from a first network to a second network, the system comprising:
   a mobile terminal (MT) for transmitting to a Media Independent Handover Server (MIHS) context including first network access information that is used by the MT to access the first network, when a first handover is performed from the first network to the second network, for receiving from the MIHS the previously transmitted first network access information through the currently used second network, when a second handover is performed from the second network to the first network, and for performing the second handover from the second network back to the first network without a network scanning procedure, a ranging procedure, a security authentication procedure, a mobile Internet Protocol (IP) binding update procedure, and a service registration procedure, based on the first network access information received from the MIHS and which was previously transmitted from the MT to the MIHS; and
   the MIHS for receiving from the MT the context including the first network access information that is used by the MT to access the first network, receiving from the MT a request for the previously transmitted first network access information, and transmitting to the MT the previously transmitted first network access information for the MT to use to perform the second handover from the second network back to the first network without a negotiation process,
   wherein the MIHS manages a profile of information varied in real-time, and the profile of information comprises at least one of Internet Protocol address of the MT, authentication information, and a using service characteristic.

19. The system of claim 18, wherein the received first network access information is updated first network access information determined by the MIHS and other network servers.

20. The system of claim 18, wherein the first network is a Worldwide Interoperability for Microwave Access (WiMAX) network and the second network is a Wireless Local Area Network (WLAN) network.

21. The system of claim 18, wherein the first network access information transmission and reception between the MT and the MIHS is achieved using a context transfer protocol.

22. The system of claim 18, wherein the first network access information transmission and reception between the MT and the MIHS is achieved through a relay of an upper layer higher up than a Media Access Control (MAC) layer of the first network or the second network.

23. A mobile terminal (MT) apparatus for decreasing handover latency from a first network to a second network, the apparatus comprising:
- a memory for storing first network access information that is used to access the first network; and
- a controller for controlling the handover latency by controlling the memory,
- wherein, when a first handover is performed from the first network to the second network, the MT transmits to a Media Independent Handover Server (MIHS) context including the first network access information that is used to access the first network, when a second handover is performed from the second network to the first network, the MT receives from the MIHS the previously transmitted first network access information, and the MT performs the second handover from the second network back to the first network without a network scanning procedure, a ranging procedure, a security authentication procedure, a mobile Internet Protocol (IP) binding update procedure, and a service registration procedure, based on the first network access information received from the MIHS and which was previously transmitted from the MT to the MIHS, and
- wherein the MIHS manages a profile of information varied in real-time, and the profile of information comprises at least one of Internet Protocol address of the MT, authentication information, and a using service characteristic.

24. A Media Independent Handover Server (MIHS) apparatus for decreasing handover latency from a first network to a second network, the apparatus comprising:
- a memory for storing first network access information that is used by a mobile terminal (MT) to access the first network; and
- a controller for controlling the handover latency by controlling the memory,
- wherein the first network access information that is used by the MT to access the first network is received as context from the MT when a first handover is performed, and when a request for information for the MT to use to perform a second handover comprising the first network access information used for first network access is received from the MT, the MIHS transmits the information for the MT to use to perform the second handover from the second network back to the first network without a network scanning procedure, a ranging procedure, a security authentication procedure, a mobile Internet Protocol (IP) binding update procedure, and a service registration procedure, the information comprising the previously received first network access information, to the MT, when the second handover is performed, and
- wherein the MIHS manages a profile of information varied in real-time, and the profile of information comprises at least one of Internet Protocol address of the MT, authentication information, and a using service characteristic.

* * * * *